(12) United States Patent
Park et al.

(10) Patent No.: US 11,231,776 B2
(45) Date of Patent: Jan. 25, 2022

(54) METHOD AND APPARATUS FOR PREDICTING INTENTION OF USER

(71) Applicant: Samsung Electronics Co., Ltd., Suwon-si (KR)

(72) Inventors: Seungin Park, Yongin-si (KR); Hyong Euk Lee, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 120 days.

(21) Appl. No.: 16/699,937

(22) Filed: Dec. 2, 2019

(65) Prior Publication Data

US 2021/0018978 A1 Jan. 21, 2021

(30) Foreign Application Priority Data

Jul. 16, 2019 (KR) .................. 10-2019-0085606

(51) Int. Cl.
*G06F 3/01* (2006.01)
*G06K 9/00* (2006.01)

(52) U.S. Cl.
CPC ......... *G06F 3/013* (2013.01); *G06K 9/00281* (2013.01); *G06K 9/00302* (2013.01)

(58) Field of Classification Search
None
See application file for complete search history.

(56) References Cited

U.S. PATENT DOCUMENTS

| | | | |
|---|---|---|---|
| 8,542,928 B2 | 9/2013 | Kaneda et al. | |
| 8,934,709 B2 | 1/2015 | Saptharishi et al. | |
| 10,056,018 B1 * | 8/2018 | Laski | G09F 19/20 |
| 10,133,346 B2 | 11/2018 | Sezgin et al. | |
| 2011/0074789 A1 * | 3/2011 | Helfman | G06K 9/6254 |
| | | | 345/441 |
| 2019/0156150 A1 * | 5/2019 | Krishnan | A61B 3/113 |
| 2020/0206920 A1 * | 7/2020 | Ma | G06K 9/6223 |

FOREIGN PATENT DOCUMENTS

| | | |
|---|---|---|
| EP | 2 118 864 B1 | 7/2014 |
| KR | 10-1121712 B1 | 3/2012 |
| KR | 10-2015-0108575 A | 9/2015 |
| KR | 10-1847446 B1 | 4/2018 |
| KR | 10-2018-0111467 A | 10/2018 |
| KR | 10-1939772 B1 | 1/2019 |

(Continued)

OTHER PUBLICATIONS

Fuhl, Wolfgang, et al. "Encodji: encoding gaze data into emoji space for an amusing scanpath classification approach." Proceedings of the 11th ACM Symposium on Eye Tracking Research & Applications. 2019. (Year: 2019).*

(Continued)

*Primary Examiner* — Michelle M Entezari (74) *Attorney, Agent, or Firm* — NSIP Law (57) ABSTRACT

A method and apparatus for predicting an intention acquires a gaze sequence of a user, acquires an input image corresponding to the gaze sequence, generates a coded image by visually encoding temporal information included in the gaze sequence to the input image, and predicts an intention of the user corresponding to the gaze sequence based on the input image and the coded image.

24 Claims, 8 Drawing Sheets

(56) References Cited

FOREIGN PATENT DOCUMENTS

KR  10-2019-0030140 A  3/2019

OTHER PUBLICATIONS

Huang, Y., Cai, M., Li, Z., & Sato, Y. (2018). Predicting gaze in egocentric video by learning task-dependent attention transition. In Proceedings of the European Conference on Computer Vision (ECCV) (pp. 754-769). (Year: 2018).*

Anderson NC, Anderson F, Kingstone A, Bischof WF. A comparison of scanpath comparison methods. Behavior research methods. Dec. 2015;47(4):1377-92. (Year: 2015).*

McCamy MB, Otero-Millan J, Di Stasi LL, Macknik SL, Martinez-Conde S. Highly informative natural scene regions increase microsaccade production during visual scanning. Journal of neuroscience. Feb. 19, 2014;34(8):2956-66. (Year: 2014).*

Mealha, O., et al., "Eye Tracking Data Representation and Visualization: on Information and Communication studies at CETAC.MEDIA.", *Journal of Eye Tracking, Visual Congnition and Emotion*, Voule 2, No. 1, 2012 (pp. 65-75).

Anderson, Nicola C., et al., "Recurrence quantification analysis of eye movements." *Behavior Research Methods*, vol. 45, Issue 3, Sep. 2013 (pp. 842-856).

Haji-Abolhassani, Amin, et al., "An inverse Yarbus process: Predicting observers' task from eye movement patterns." *Vision research*, vol. 103, 2014 (pp. 127-142).

Blascheck, Tanja, et al. "Visualization of eye tracking data: A taxonomy and survey." *Computer Graphics Forum*, vol. 36. No. 8. 2017 (pp. 1-5).

\* cited by examiner

METHOD AND APPARATUS FOR PREDICTING INTENTION OF USER

CROSS-REFERENCE TO RELATED APPLICATIONS

This application claims the benefit under 35 USC § 119(a) of Korean Patent Application No. 10-2019-0085606 filed on Jul. 16, 2019 in the Korean Intellectual Property Office, the entire disclosure of which is incorporated herein by reference for all purposes.

BACKGROUND

1. Field

The following description relates to a method and apparatus for predicting an intention of a user.

2. Description of Related Art

When an image and/or information required for a user are matched and displayed automatically without explicit user input on an augmented reality (AR) application image, it is helpful for the user to determine a situation immediately and act appropriately to manage the situation. Depending on information required for the user, the user performs a different cognitive task to obtain the information. Further, the user exhibits a different visual attention pattern for a different cognitive task. For example, gaze information is a fastest sensory cue which is closely associated with visual attention. By analyzing the user's gaze trajectories, it is possible to distinguish an intention of the user and/or the information required for the user.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, there is provided a method of predicting an intention, the method including acquiring a gaze sequence of a user, acquiring an input image corresponding to the gaze sequence, generating a coded image by visually encoding temporal information included in the gaze sequence to the input image, and predicting an intention of the user corresponding to the gaze sequence based on the input image and the coded image.

The temporal information may include any one or any combination of a gaze trajectory corresponding to the gaze sequence in the input image, a velocity during eye movements, a duration of each fixation, whether the fixations are repeated on a previous region, a count of the recurrent/repeated fixations, an interval of the recurrent/repeated fixations, and a coverage of the fixations.

The generating may include generating coded partial images by encoding the temporal information to each RGB channel in regions of the input image to which gazes corresponding to the gaze sequence are mapped, and generating the coded image by combining the coded partial images.

The generating of the coded partial images may include generating circles corresponding to the temporal information in the regions.

The method may include increasing an intensity value of a circle among the circles, in response to a gaze of the gazes returning to the circle.

The method may include setting a radius of a circle among the circles to be smaller than an average radius of the circles, in response to a velocity during eye movements being greater than a threshold.

The method may include setting a radius of a circle among the circles to be greater than an average radius of the circles, in response to a velocity during eye movements being smaller than a threshold.

The generating of the circles may include generating a circle among the circles having a radius greater than an average radius of the circles, in response to a maximum distance or an average distance of the gazes for a timestep being less than a threshold.

The generating of the circles may include generating a circle among the circles to have a radius lesser than an average radius of the circles, in response to a maximum distance or an average distance of the gazes for a timestep being greater than a threshold.

The predicting may include obtaining feature vectors corresponding to the gaze sequence based on the input image and the coded image, and predicting the intention of the user based on the feature vectors.

The obtaining of the feature vectors may include extracting first feature vectors from regions of the input image to which gazes corresponding to the gaze sequence are mapped, extracting second feature vectors based on the coded image, and obtaining feature vectors corresponding to the gaze sequence by concatenating the first feature vectors and the second feature vectors.

The first feature vectors may be extracted based on applying the regions of the input image to a first feature encoder that is trained to extract the first feature vectors from the image sequence, and the second feature vectors are extracted based on applying the coded image a second feature encoder that is trained to extract the second feature vectors from the gaze sequence.

The input image may be acquired based on a first sampling frequency, and the gaze sequence may be acquired based on a second sampling frequency that may be higher than the first sampling frequency.

The generating may include accumulating gazes sampled based on the second sampling frequency, based on the first sampling frequency, and generating a coded image synchronized to the first sampling frequency, based on a sequence of the accumulated gazes.

The intention of the user may include any one or any combination of search, counting, object identification, and freeview.

The method may include providing information according to the intention based on any one or any combination of the intention, the gaze sequence, and the input image.

In another general aspect, there is provided an apparatus for predicting an intention, the apparatus including a communication interface configured to acquire a gaze sequence of a user and an input image corresponding to the gaze sequence, and a processor configured to generate a coded image by visually encoding temporal information included in the gaze sequence to the input image, and predict an intention of the user corresponding to the gaze sequence based on the input image and the coded image.

The temporal information may include any one or any combination of a gaze trajectory corresponding to the gaze sequence in the input image, a velocity during eye movements, a duration of each fixation, whether the fixations are repeated on a previous region, a count of the recurrent/repeated fixations, an interval of the recurrent/repeated fixations, and a coverage of the fixations.

The processor may be configured to generate coded partial images by encoding the temporal information to each RGB channel in regions of the input image to which gazes corresponding to the gaze sequence are mapped, and to generate the coded image by combining the coded partial images.

The processor may be configured to generate circles corresponding to the temporal information in the regions.

The processor may be configured to obtain feature vectors corresponding to the gaze sequence based on the input image and the coded image, and to predict the intention of the user based on the feature vectors.

The processor may be configured to extract first feature vectors from regions of the input image to which gazes corresponding to the gaze sequence are mapped, to extract second feature vectors based on the coded image, and to obtain feature vectors corresponding to the gaze sequence by concatenating the first feature vectors and the second feature vectors.

The input image may be acquired based on a first sampling frequency, and the gaze sequence may be acquired based on a second sampling frequency that may be higher than the first sampling frequency.

The processor may be configured to accumulate gazes sampled based on the second sampling frequency, based on the first sampling frequency, and generate a coded image synchronized to the first sampling frequency, based on a sequence of the accumulated gazes.

The processor may be configured to provide information according to the intention based on any one or any combination of the intention, the gaze sequence, and the input image.

Other features and aspects will be apparent from the following detailed description, the drawings, and the claims.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, except for operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

The terminology used herein is for the purpose of describing examples only and is not to be limiting of the examples. As used herein, the singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

It will be understood that when a component is referred to as being "connected to" another component, the component can be directly connected or coupled to the other component or intervening components may be present. When describing the examples with reference to the accompanying drawings, like reference numerals refer to like constituent elements and a repeated description related thereto will be omitted. In the description of examples, detailed description of well-known related structures or functions will be omitted when it is deemed that such description will cause ambiguous interpretation of the present disclosure.

Figure 1A:
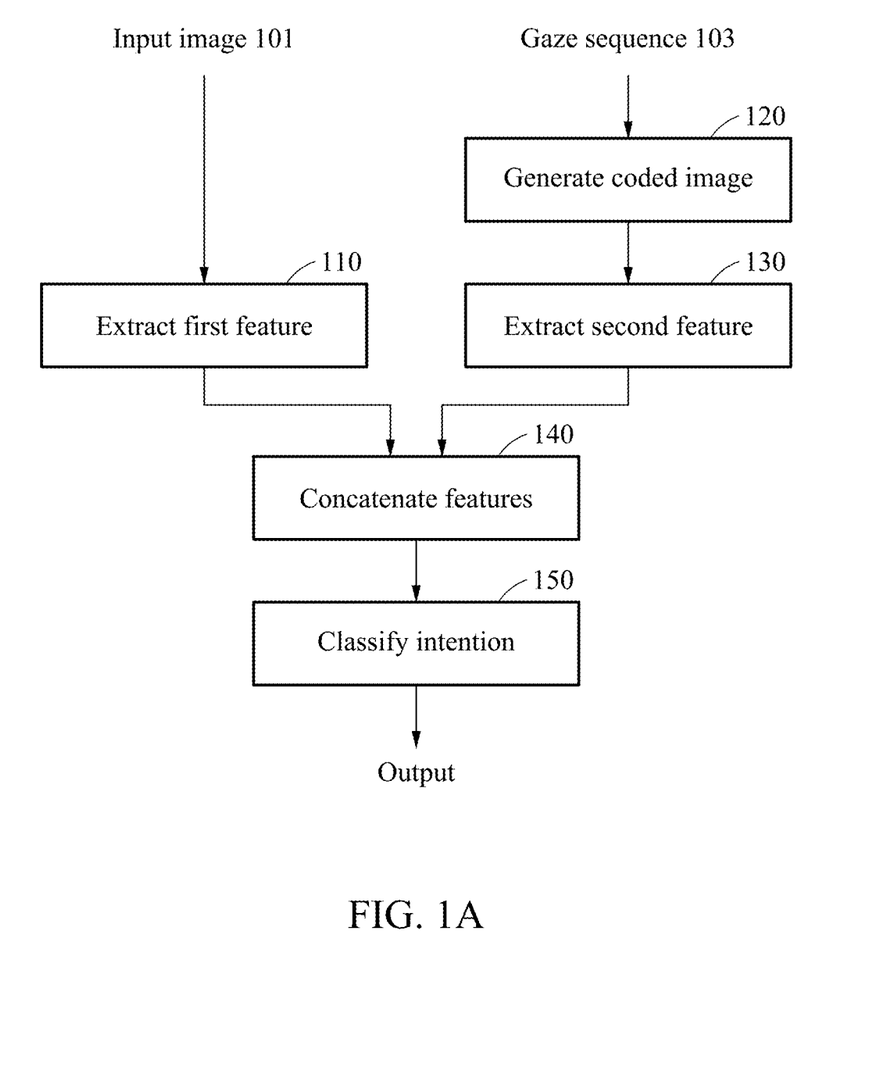
FIG. 1A illustrates an example of predicting an intention of a user from an input image and a gaze sequence.

FIG. 1A illustrates an example of predicting an intention of a user from an input image and a gaze sequence. Referring to FIG. 1A, an example in which an apparatus for predicting an intention, hereinafter, the prediction apparatus, classifies an intention of a user from an input image 101 and a gaze sequence 103 is illustrated.

The input image 101 corresponds to, for example, image information as a camera image with respect to a region visible to the user. In an example, the input image 101 includes information related to a sampling frequency at which the input image 101 is acquired. For example, the input image 101 includes information related to a first sampling frequency.

The gaze sequence 103 corresponds to gaze information of the user, which is mapped to the input image 101. The prediction apparatus obtains temporal information through time-series analysis about fixations, for example, analyzing the gaze information of the user, for example, information related to coordinates on which a gaze focuses in the input image 101.

The gaze sequence 103 includes information related to eye movements of the user, which is accumulated over time. The gaze sequence 103 includes a variety of temporal information such as, for example, a gaze trajectory corresponding to the gaze sequence, a velocity during eye movements, a duration of each fixation, whether the fixations are repeated on a previously fixated region, a count of the recurrent/repeated fixations, an interval of the recurrent/repeated fixations, and a coverage of the fixations. The gaze trajectory is also referred to as a "scan path" of the gaze.

The gaze sequence 103 includes information related to a sampling frequency at which the gaze sequence 103 is acquired, for example, a second sampling frequency. The first sampling frequency and the second sampling frequency are the same or different from each other. For example, since eyes move at a rate of 500 Hz higher than a frame rate of a camera, the gaze sequence 103 should be acquired at a much higher rate. Thus, the second sampling frequency is higher than the first sampling frequency.

The two inputs of the prediction apparatus, for example, the input image 101 and the gaze sequence 103, include information of different domains and different frequencies. The method and apparatuses disclosed herein efficiently embeds the two types of information, i.e., the image information corresponding to the input image 101 and the gaze information corresponding to the gaze sequence 103.

When the input image 101 is provided, the prediction apparatus extracts a first feature from the input image 101, for example, through a feature extractor, in operation 110. A feature extracted from the input image 101 will be referred to as the "first feature". The first feature is in the form of a feature vector.

When the gaze sequence 103 is provided, the prediction apparatus visually encodes and images the gaze sequence 103. The prediction apparatus encodes the gaze sequence 103, for example, to each RGB channel and/or to each intensity. In operation 120, the prediction apparatus generates a coded image by visually encoding the temporal information included in the gaze sequence 103. In operation 130, the prediction apparatus extracts a second feature by transmitting the coded image to the feature extractor. Hereinafter, a feature extracted from the coded image will be referred to as the "second feature". In an example, the second feature is in the form of a feature vector. In an example, the feature extractor separately extracts a feature from each per-RGB channel image, and then combines the features, or extracts a feature by integrating RGB-encoded partial images into one image within a limit allowable by the number of channels.

By visually encoding the gaze sequence 103 into image information of a type such as the input image 101, the information of the input image 101 and the information of the gaze sequence 103 are converted into the form of feature vectors through the same encoder. In operation 140, the prediction apparatus concatenates the first feature and the second feature converted into the form of vectors. In an example, concatenation is construed as association or combination.

In operation 150, the prediction apparatus classifies an intention of the user by applying a result of concatenating the features in operation 140 to an input of a classifier. The intention of the user may include intentions, such as, for example, search, counting, object identification, and freeview. In this example, the classifier is trained to classify the intention of the user from the feature vectors.

Figure 1B:
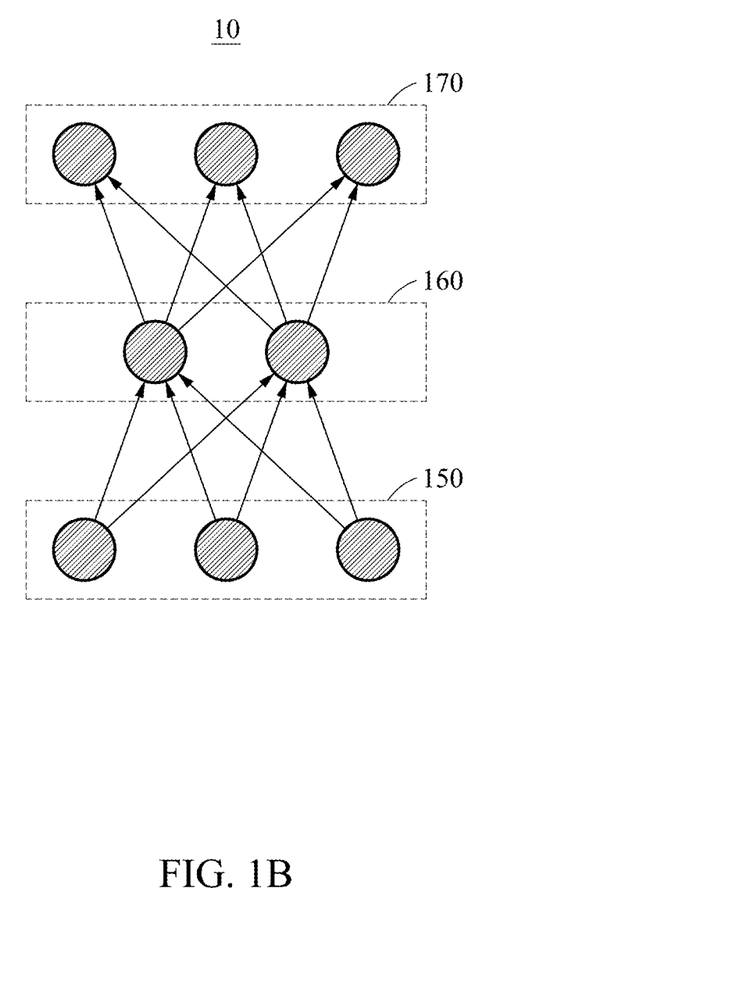
FIG. 1B illustrates an example of a neural network-based classifiers for predicting an intention.

In an example, the classifier includes neural network-based classifiers, such as, for example, a recurrent neural network (RNN), a convolutional neural network (CNN), or a support vector machine (SVM). In an example, the CNN may be a deep neural network (DNN). In an example, the DNN may include a region proposal network (RPN), a classification network, a reinforcement learning network, a fully-connected network (FCN), a deep convolutional network (DCN), a long-short term memory (LSTM) network, and a grated recurrent units (GRUs). The DNN may include a plurality of layers. As shown in FIG. 1B, a neural network 10 includes a plurality of layers, each including a plurality of nodes. Also, the neural network 10 includes connection weights that connect the plurality of nodes included in each of the plurality of layers to a node included in another layer.

In the neural network 10, the plurality of layers may include an input layer 150, at least one hidden layer 160, and an output layer 170. In an example, neural network may include additional layers, such as, for example, a sub-sampling layer, a pooling layer, and a fully connected layer.

The input layer 150 receives an input for performing training or recognition and transfers the input to the hidden layer 160. The output layer 170 generates an output of the neural network 10 based on a signal received from the hidden layer 160. The hidden layer 160 is interposed between the input layer 150 and the output layer 160, and changes data transferred though the input layer 150 to a value that is easy to predict. Input nodes included in the input layer 150 and hidden nodes included in the hidden layer 160 are connected through edges having connection weights. The hidden nodes included in the hidden layer 160 and output nodes included in the output layer 170 are connected through edges having connection weights. The neural network 10 may include a plurality of hidden layers.

In an example, neural network 10 may receive an input image. In such an example, a convolution operation is performed on the input image with a kernel, and as a result, the feature maps are output. The convolution operation is performed again on the output feature maps as input feature maps, with a kernel, and new feature maps are output. When the convolution operation is repeatedly performed as such, a recognition result with respect to features of the input image may be finally output through the output layer 170 of the neural network 10. Input data for the neural network 10 may include image data, voice data, and text data. However, they are provided as examples only, and other types of data are considered to be well within the scope of the present disclosure.

In an example, one or more feature extractors are also neural networks that are trained to extract the respective features. In an example, the temporal information included in the gaze sequence is imaged as the coded image, and the feature extractor such as a DNN is trained to extract the second feature from the coded image. The prediction apparatus obtains information important to predict the intention of the user from heterogenous information through training, without explicitly designating a dimension for data analysis through the above process, which leads to an improvement in the performance of the classifier for classifying the intention of the user.

In an example, the prediction apparatus is utilized for the field of AR application to build a natural user interface based on the gaze of the user.

Figure 2:
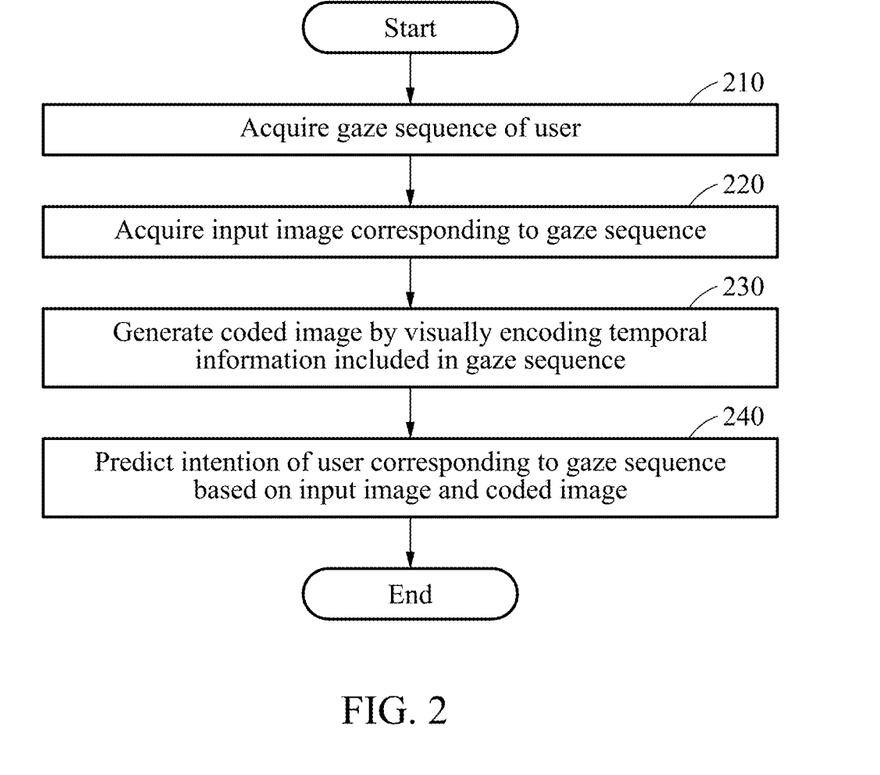
FIG. 2 illustrates an example of a method of predicting an intention.

FIG. 2 illustrates an example of a method of predicting an intention. The operations in FIG. 2 may be performed in the sequence and manner as shown, although the order of some operations may be changed or some of the operations omitted without departing from the spirit and scope of the illustrative examples described. Many of the operations shown in FIG. 2 may be performed in parallel or concurrently. One or more blocks of FIG. 2, and combinations of the blocks, can be implemented by special purpose hardware-based computer, and devices such as a processor, that perform the specified functions, or combinations of special purpose hardware and computer instructions. In addition to the description of FIG. 2 below, the descriptions of FIGS. 1A-1B is also applicable to FIG. 2 and are incorporated herein by reference. Thus, the above description may not be repeated here.

Referring to FIG. 2, in operation 210, an apparatus for predicting an intention, hereinafter, the "prediction apparatus", acquires a gaze sequence of a user.

In operation 220, the prediction apparatus acquires an input image corresponding to the gaze sequence. Here, the "input image corresponding to the gaze sequence" refers to an image to which the gaze of the user is fixated. For example, when the gaze sequence includes a plurality of eye movements, the input image includes partial input images corresponding to the fixated region to which the gaze of the user is fixated. In an example, operations 210 and 220 are concurrently performed. However, the examples are not limited thereto. Operations 210 and 220 may also be performed at a short time interval that the user may not recognize.

In operation 230, the prediction apparatus generates a coded image by visually encoding temporal information included in the gaze sequence. In an example, the prediction apparatus generates coded partial images by encoding the temporal information to each RGB channel in fixated regions to which gazes corresponding to the gaze sequence are mapped in the input image. In an example, the prediction apparatus generates a single coded image by combining the coded partial images. An example in which the prediction apparatus generates a coded image will be described further below with reference to FIG. 3.

In operation 240, the prediction apparatus predicts an intention of the user corresponding to the gaze sequence based on the input image and the coded image. The prediction apparatus obtains feature vectors corresponding to the gaze sequence based on the input image and the coded image. The prediction apparatus extracts first feature vectors from the fixated regions to which the gazes corresponding to the gaze sequence are mapped in the input image. The prediction apparatus extracts the first feature vectors from the fixated regions to which the gazes corresponding to the gaze sequence are mapped in the input image, for example, using a DNN. The prediction apparatus extracts second feature vectors based on the coded image. The prediction apparatus extracts the second feature vectors with respect to the coded image using a general visual feature extractor, or extracts the second features vectors using a feature extractor trained using a ground truth with respect to the gaze sequence. The prediction apparatus obtains feature vectors corresponding to the gaze sequence by concatenating the first feature vectors and the second feature vectors. The prediction apparatus predicts the intention of the user based on the feature vectors.

The intention of the user predicted by the prediction apparatus includes intentions such as, for example, search, counting, object identification, and freeview. However, examples are not limited thereto.

The prediction apparatus provides information according with the predicted intention based on any one or any combination of the predicted intention, the gaze sequence, and the input image.

Figure 3:
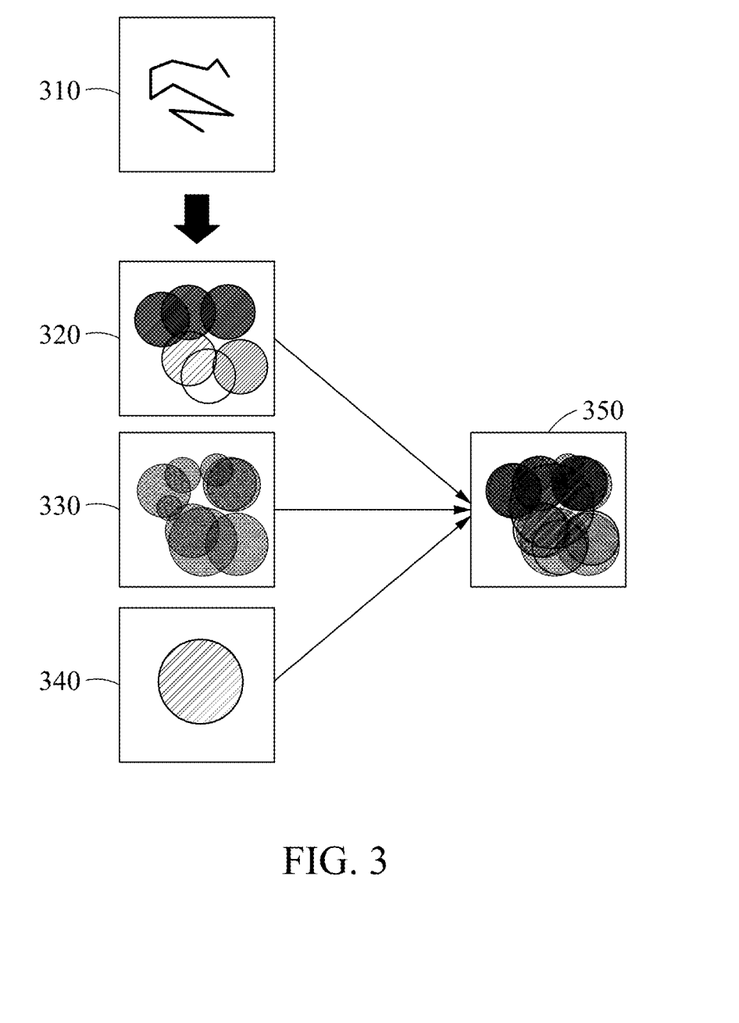
FIG. 3 illustrates an example of generating a coded image.

FIG. 3 illustrates an example of generating a coded image. Referring to FIG. 3, a gaze sequence 310, coded partial images 320, 330, and 340 generated from the gaze sequence 310, and a single coded image 350 generated by combining the coded partial images 320, 330, and 340 are illustrated.

In an example, the prediction apparatus generates the coded partial images 320, 330, and 340 by encoding temporal information to each RGB channel and/or to each intensity in fixated regions to which gazes corresponding to the gaze sequence 310 are mapped in an input image.

The prediction apparatus generates the coded partial images 320, 330, and 340 by generating circles corresponding to the temporal information in the fixated regions to which the gazes corresponding to the gaze sequence 310 are mapped in the input image. The prediction apparatus generates the circles in different diameters, different colors, and different intensities, based on the temporal information.

For example, a gaze of a timestep t is indicated as p, a current timestep is indicated as $t_c$, and a timestep Δx before the current timestep is indicated as $t_p$. In this example, gaze information with respect to a period from $t_p$ to $t_c$ is generated as a single coded image in the following manner.

The prediction apparatus encodes a gaze trajectory, which is one of the temporal information, to a single RGB channel, as shown in the coded partial images 320. The gaze trajectory is encoded in a red (R) channel. The prediction apparatus generates a circle C with a radius r in each fixated region or gaze position to which each gaze p is mapped in the input image. The prediction apparatus represents a color intensity value of each circle C differently based on temporal information t. In an example, it is assumed that the significance of the information decays over time. In this example, an intensity of a circle $C_c$ by a gaze $p_c$ at the current timestep $t_c$ is set to a greatest value, and an intensity of a circle $C_p$ by a gaze $p_p$ at the previous timestep $t_p$ is set to a smallest value.

For example, when 8 bits are provided for each channel in a red, green, blue (RGB) image, each channel has an integer range of 0 to 255. The prediction apparatus sets an intensity value of the circle $C_c$ to 255, and sets an intensity value of the circle $C_p$ to 0. The prediction apparatus represents an intensity value of a circle expressing the gaze p during the period from $t_p$ to $t_c$ in view of a period Δx between the current timestep $t_c$ and the previous timestep $t_p$ and the intensity value of the circle $C_c$ at the current timestep.

In an example, the prediction apparatus sets all the intensity values of the circles by the gazes at timesteps of the entire period identically, without considering a deterioration of information over time depending on an application field.

For example, the prediction apparatus encodes a duration of each fixation, and a velocity during eye movements, of the temporal information, along with the coded partial image 330 in a single RGB channel. The duration of each fixation is encoded, for example, to a blue (B) channel. In this example, the prediction apparatus generates circles with the same intensity at a position of each gaze p. When the gaze revisits the fixated region or the duration of each fixation increases, the prediction apparatus generates overlapping circles in the fixated region, and thus intensity values of the circles are accumulated and increase. For example, the prediction apparatus sets a radius of a circle to be small when the velocity during eye movements is fast, and sets a radius of a circle to be great when the velocity during eye movements is slow, thereby reflecting a weight of attention of the user in the coded partial image 330 based on the velocity during eye movements.

The prediction apparatus encodes a coverage of the fixations, which is one of the temporal information, to a single RGB channel, as shown in the coded partial image 340. The coverage of the fixations is encoded to a green (G) channel. The prediction apparatus encodes the coverage of the fixations to the RGB channel using a maximum distance or an average distance of gazes p existing in the period Δx. The prediction apparatus generates a circle with a greater radius and a greater intensity value as the maximum distance or the average distance of the gazes p for each timestep is less than a threshold. The prediction apparatus generates a circle with a smaller radius and a smaller intensity value as the maximum distance or the average distance of the gazes p for each timestep is greater than the threshold.

The prediction apparatus extracts a portion in which circles overlap and encodes the portion to a single RGB channel, with respect to the circles generated for the period Δx. The prediction apparatus sets a greater intensity value for an overlapping portion occurring at a timepoint close to the current timestep $t_c$, and set a smaller intensity value for an overlapping portion occurring at a timepoint far from the current timestep, in view of a deterioration of information over time.

The prediction apparatus generates the single coded image 350 by combining the coded partial images 320, 330, and 340. The coded image 350 is, for example, an RGB image.

The prediction apparatus extracts a second feature from the color-encoded, coded image 350 using a feature extractor such as, for example, a deep convolutional neural network for object recognition developed by Oxford's Visual Geometry Group (VGG), a residential neural network (ResNet), or MobileNet.

Since a final purpose of classification is different, the prediction apparatus adjusts a network configuration of the feature extractor such that the feature extractor removes upper layers and uses only lower layers to extract low-level features.

For example, when there is a training database, the feature extractor is trained or fine-tuned. However, even when said process is omitted, the prediction apparatus obtains a discriminative feature set for different gaze patterns each gaze sequence.

For ease of description, an example of generating the coded partial images 320, 330, and 340 as the single coded image 350 has been described. However, examples are not limited thereto. The coded image 350 may be abstracted into multiple images, or may be generated in various manners, for example, using multiple channels with respect to one dimension of data. Further, characteristics of the gaze sequence other than those in the above examples may also be imaged.

Figure 4:
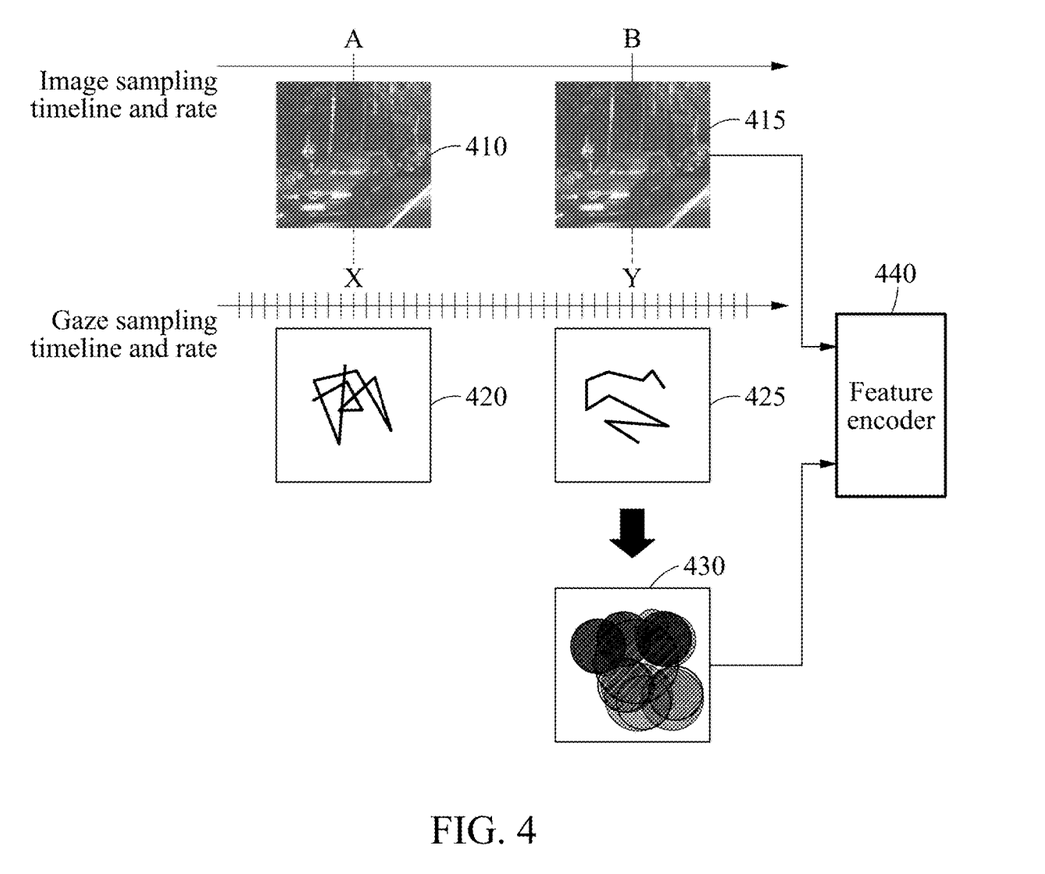
FIG. 4 illustrates an example of synchronizing an input image and a gaze sequence.

FIG. 4 illustrates an example of synchronizing an input image and a gaze sequence. In general, it is known that a human eye moves at speed of at least 500°/s. Thus, a sampling frequency required for accurately tracking a gaze sequence, for example, a second sampling frequency, is at least 500 Hz. The second sampling frequency is much higher than a typical range of a sampling frequency of 30 to 120 Hz at which the input image is acquired through the camera, for example, a first sampling frequency.

Thus, even when a sampling frequency of a capturing device for acquiring the two types of information, the input image being image information and the gaze sequence, is not synchronized, the methods and apparatuses described herein appropriately embeds and uses the two types of information.

The prediction apparatus represents a gaze sequence 420 and a gaze sequence 425 by accumulating eye movements in a single image for each period of sampling timeline or sampling timestep. In this example, a length of the period for which the eye movements are accumulated is determined based on a sampling frequency of information, for example, an image, to be used by concatenating features.

In an example, when a first sampling frequency at which an input image 410 is acquired and a second sampling frequency at which the gaze sequence 420 is acquired match, the prediction apparatus generates a coded image based on the gaze sequence 420 sampled based on the second sampling frequency.

In another example, when a first sampling frequency at which an input image 415 is acquired is lower than a second sampling frequency at which the gaze sequence 425 is acquired, the prediction apparatus accumulates a plurality of gazes sampled based on the second sampling frequency, based on the first sampling frequency. For example, when the first sampling frequency is lower than the second sampling frequency, the prediction apparatus accumulates the plurality of gazes during a time interval, for example, a period from X to Y, during which the second sampling frequency matches the first sampling frequency. The prediction apparatus generates a coded image 430 synchronized to the first sampling frequency at which the input image 415 is acquired based on the gaze sequence 425 including the plurality of gazes accumulated during the period from X to Y. The prediction apparatus extracts features from the input image 415 and the coded image 430 through a feature encoder 440, and converts the features into feature vectors. The feature encoder 440 operates in the same manner as the feature extractor described above.

The prediction apparatus accumulates and images gaze information, for example, a gaze sequence, input at high speed through the above process during Δx, and uses the accumulated gaze information along with image information, for example, an input image, input at low speed.

Figure 5:
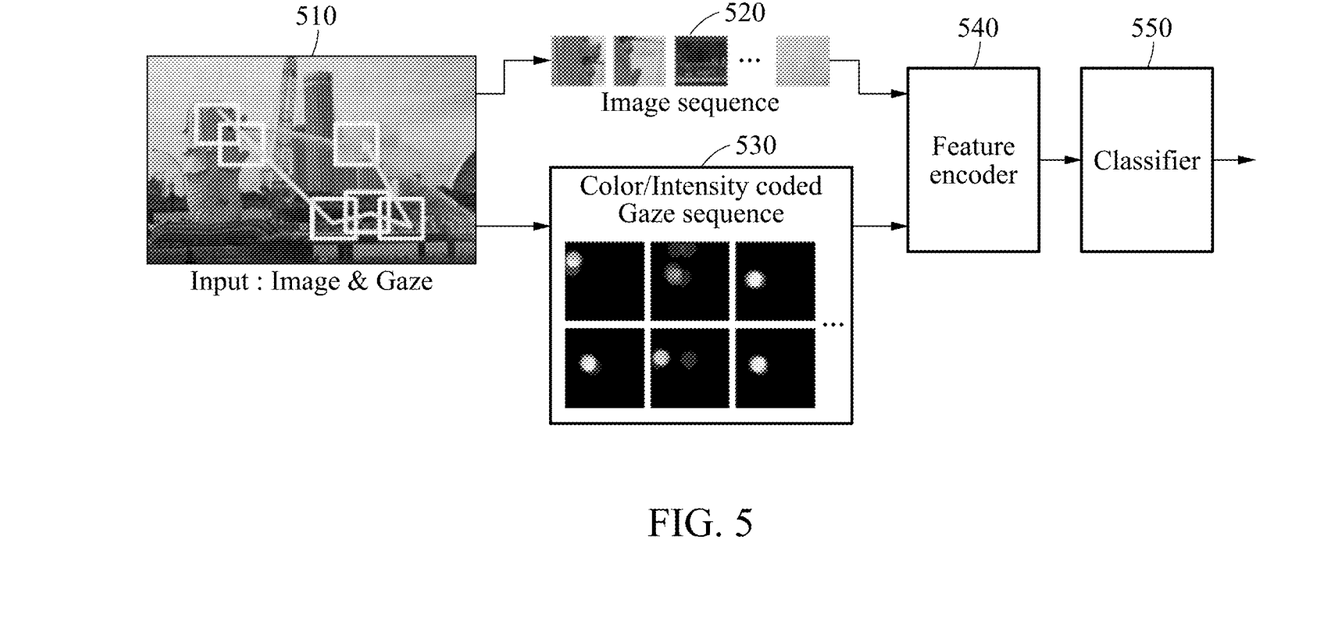
FIGS. 5 and 6 illustrate examples of structures of an apparatus for predicting an intention.

FIG. 5 illustrates an example of a structure of an apparatus for predicting an intention. Referring to FIG. 5, a structure of an prediction apparatus for classifying and predicting an intention of a user through the feature encoding process described above is illustrated.

In operation 510, the prediction apparatus receives an input image captured by a camera and a gaze sequence of a user corresponding to the input image.

In operation 520, the prediction apparatus generates an image sequence by extracting fixated regions to which gazes of the user are mapped in the input image. In an example, the prediction apparatus uses the entire input image without extracting fixated regions. Concurrently, in operation 530, the prediction apparatus generates a coded image by visually encoding temporal information included in the gaze sequence. Operations 520 and 530 described above correspond to image pre-processing.

In operation 540, the prediction apparatus obtains a feature by applying pre-processed images to a feature encoder or an input of the feature encoder. In this example, the feature is in the form of a vector. The prediction apparatus obtains a feature representation corresponding to the pre-processed images using the above feature extractor, irrespective of a type of the image.

In operation 550, the prediction apparatus classifies an intention of the user by applying the feature representation to a classifier. The prediction apparatus selects a suitable classifier structure such as, for example, a DNN or an SVM.

Figure 6:
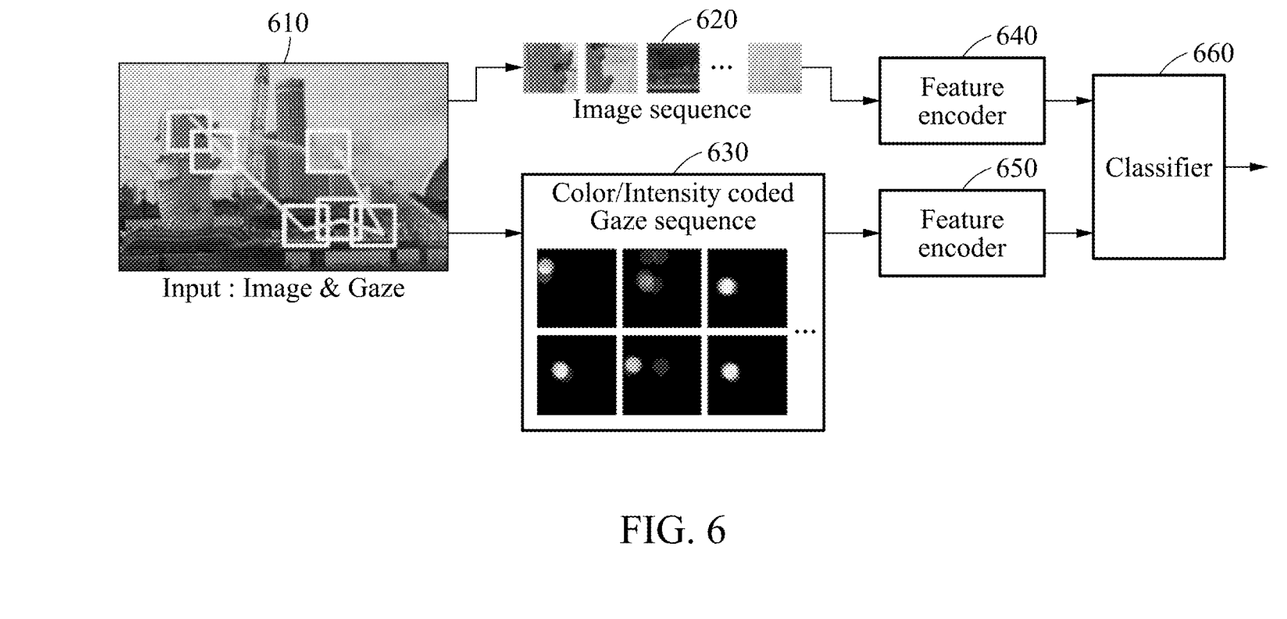

FIG. 6 illustrates an example of a structure of an apparatus for predicting an intention. Operations 610 through 630 of FIG. 6 are the same as operations 510 through 530 of FIG. 5. In addition to the description of FIG. 6 below, the corresponding description of FIG. 5 is also applicable to FIG. 6 and are incorporated herein by reference. Thus, the above description may not be repeated here.

In an example, unlike the example of FIG. 5, the prediction apparatus applies the pre-processed images to inputs of separate feature encoders.

In operation 640, the prediction apparatus obtains a first feature by applying the image sequence generated in operation 620 to a first feature encoder. The first feature encoder is pre-trained to extract the first feature from the image sequence.

In addition, in operation 650, the prediction apparatus obtains a second feature by applying the gaze sequence acquired in operation 630 to a second feature encoder. The second feature encoder is pre-trained to extract the second feature from the gaze sequence. When there is labeled ground-truth data of the gaze sequence, the prediction apparatus trains the second feature encoder through fine tuning, thereby improving the accuracy of the second feature.

In operation 660, the prediction apparatus classifies an intention of a user using the first feature and the second feature.

Figure 7:
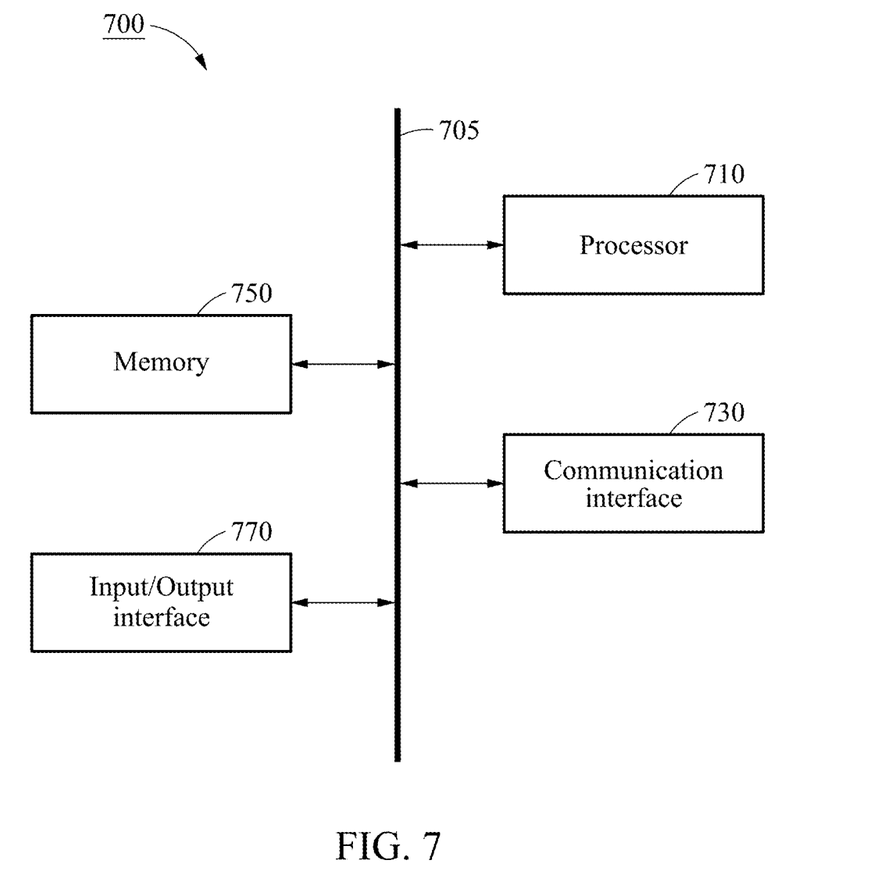
FIG. 7 illustrates an example of an apparatus for predicting an intention.

FIG. 7 illustrates an example of an apparatus for predicting an intention. Referring to FIG. 7, an apparatus 700 for predicting an intention, hereinafter the "prediction apparatus" 700, includes a processor 710 and a communication interface 730. The prediction apparatus 700 further include a memory 750 and a input/output interface 770. The processor 710, the communication interface 730, the memory 750, and the input/output interface 770 communicate with each other through a communication bus 705.

The processor 710 generates a coded image by visually encoding temporal information included in a gaze sequence. The processor 710 predicts an intention of a user corresponding to the gaze sequence based on an input image and the coded image.

The communication interface 730 acquires the gaze sequence of the user and the input image corresponding to the gaze sequence.

The memory 750 stores the gaze sequence of the user and the input image corresponding to the gaze sequence. The memory 750 stores the coded image generated by the processor 710 and/or the intention of the user predicted by the processor 710. In this example, the memory 750 matches and stores the intention of the user and the gaze sequence of the user.

Further, the processor 710 performs the at least one method described with reference to FIGS. 1 through 6 or an algorithm corresponding to the at least one method. The processor 710 is a data processing device implemented by hardware including a circuit having a physical structure to perform desired operations. For example, the desired operations include instructions or codes included in a program. For example, the hardware-implemented data processing device includes a microprocessor, a central processing unit (CPU), a processor core, a multi-core processor, a reconfigurable processor, a multicore processor, a multiprocessor, an application-specific integrated circuit (ASIC), a field programmable gate array (FPGA), a graphics processor unit (GPU), or any other type of multi- or single-processor configuration. Further details regarding the processor 710 is provided below.

The processor 710 executes the program, and controls the prediction apparatus 700. The program codes executed by the processor 710 are stored in the memory 750.

The memory 750 stores a variety of information generated during the processing process of the processor 710. In addition, the memory 750 stores a variety of data and programs. The memory 750 includes a volatile memory or a non-volatile memory. The memory 750 includes a large capacity storage medium such as a hard disk to store the variety of data. Further details regarding the memory 750 is provided below.

In an example, the input/output interface 770 may be a display that receives an input from a user or provides an output. In an example, the input/output interface 770 may function as an input device and receives an input from a user through a traditional input method, for example, a keyboard and a mouse, and a new input method, for example, a touch input, a voice input, and an image input. Thus, the input/output interface 770 may include, for example, a keyboard, a mouse, a touchscreen, a microphone, and other devices that may detect an input from a user and transmit the detected input to the data processing apparatus 800.

In an example, the input/output interface 770 may function as an output device, and provide an output of the prediction apparatus 700 to a user through a visual, auditory, or tactile channel. The input/output interface 770 may include, for example, a display, a touchscreen, a speaker, a vibration generator, and other devices that may provide an output to a user.

However, the input/output interface 770 are not limited to the example described above, and any other displays, such as, for example, computer monitor and eye glass display (EGD) that are operatively connected to the prediction apparatus 700 may be used without departing from the spirit and scope of the illustrative examples described. In an example, the input/output interface 770 is a physical structure that includes one or more hardware components that provide the ability to render a user interface, render a display, and/or receive user input.

The prediction apparatus 700 may be implemented in various electronic devices, such as, for example, a mobile telephone, a smartphone, a wearable smart device (such as, a ring, a watch, a pair of glasses, glasses-type device, a bracelet, an ankle bracket, a belt, a necklace, an earring, a headband, a helmet, a device embedded in the cloths, or an eye glass display (EGD)), a computing device, for example, a server, a laptop, a notebook, a subnotebook, a netbook, an ultra-mobile PC (UMPC), a tablet personal computer (tablet), a phablet, a mobile internet device (MID), a personal digital assistant (PDA), an enterprise digital assistant (EDA), an ultra mobile personal computer (UMPC), a portable lab-top PC, electronic product, for example, a robot, a digital camera, a digital video camera, a portable game console, an MP3 player, a portable/personal multimedia player (PMP), a handheld e-book, a global positioning system (GPS) navigation, a personal navigation device, portable navigation device (PND), a handheld game console, an e-book, a television (TV), a high definition television (HDTV), a smart TV, a smart appliance, a smart home device, or a security device for gate control, a walking assistance device, a robot, various Internet of Things (IoT) devices, an autonomous vehicle, an automatic or autonomous driving system, an intelligent vehicle, an advanced driver assistance system (ADAS), a head-up display (HUD), and an augmented reality head-up display (AR HUD), or any other device capable of wireless communication or network communication consistent with that disclosed herein.

In an example, the prediction apparatus 700 may be connected to an external device, such as, for example, a personal computer (PC) or a network, via an input/output device of the external device, to exchange data with the external device.

The prediction apparatus 700, and other apparatuses, units, modules, devices, and other components described herein with respect to FIGS. 1-7 are implemented by hardware components. Examples of hardware components that may be used to perform the operations described in this application where appropriate include controllers, sensors, generators, drivers, memories, comparators, arithmetic logic units, adders, subtractors, multipliers, dividers, integrators, and any other electronic components configured to perform the operations described in this application. In other examples, one or more of the hardware components that perform the operations described in this application are implemented by computing hardware, for example, by one or more processors or computers. A processor or computer may be implemented by one or more processing elements, such as an array of logic gates, a controller and an arithmetic logic unit, a digital signal processor, a microcomputer, a programmable logic controller, a field-programmable gate array, a programmable logic array, a microprocessor, or any other device or combination of devices that is configured to respond to and execute instructions in a defined manner to achieve a desired result. In one example, a processor or computer includes, or is connected to, one or more memories storing instructions or software that are executed by the processor or computer. Hardware components implemented by a processor or computer may execute instructions or software, such as an operating system (OS) and one or more software applications that run on the OS, to perform the operations described in this application. The hardware components may also access, manipulate, process, create, and store data in response to execution of the instructions or software. For simplicity, the singular term "processor" or "computer" may be used in the description of the examples described in this application, but in other examples multiple processors or computers may be used, or a processor or computer may include multiple processing elements, or multiple types of processing elements, or both. For example, a single hardware component or two or more hardware components may be implemented by a single processor, or two or more processors, or a processor and a controller. One or more hardware components may be implemented by one or more processors, or a processor and a controller, and one or more other hardware components may be implemented by one or more other processors, or another processor and another controller. One or more processors, or a processor and a controller, may implement a single hardware component, or two or more hardware components. A hardware component may have any one or more of different processing configurations, examples of which include a single processor, independent processors, parallel processors, single-instruction single-data (SISD) multiprocessing, single-instruction multiple-data (SIMD) multiprocessing, multiple-instruction single-data (MISD) multiprocessing, and multiple-instruction multiple-data (MIMD) multiprocessing.

The methods illustrated in FIGS. 1-7 that perform the operations described in this application are performed by computing hardware, for example, by one or more processors or computers, implemented as described above executing instructions or software to perform the operations described in this application that are performed by the methods. For example, a single operation or two or more operations may be performed by a single processor, or two or more processors, or a processor and a controller. One or more operations may be performed by one or more processors, or a processor and a controller, and one or more other operations may be performed by one or more other processors, or another processor and another controller. One or more processors, or a processor and a controller, may perform a single operation, or two or more operations.

Instructions or software to control a processor or computer to implement the hardware components and perform the methods as described above are written as computer programs, code segments, instructions or any combination thereof, for individually or collectively instructing or configuring the processor or computer to operate as a machine or special-purpose computer to perform the operations performed by the hardware components and the methods as described above. In an example, the instructions or software includes at least one of an applet, a dynamic link library (DLL), middleware, firmware, a device driver, an application program storing the method of predicting an intention. In one example, the instructions or software include machine code that is directly executed by the processor or computer, such as machine code produced by a compiler. In another example, the instructions or software include higher-level code that is executed by the processor or computer using an interpreter. Programmers of ordinary skill in the art can readily write the instructions or software based on the block diagrams and the flow charts illustrated in the drawings and the corresponding descriptions in the specification, which disclose algorithms for performing the operations performed by the hardware components and the methods as described above.

The instructions or software to control computing hardware, for example, one or more processors or computers, to implement the hardware components and perform the methods as described above, and any associated data, data files, and data structures, may be recorded, stored, or fixed in or on one or more non-transitory computer-readable storage media. Examples of a non-transitory computer-readable storage medium include read-only memory (ROM), random-access programmable read only memory (PROM), electrically erasable programmable read-only memory (EEPROM), random-access memory (RAM), dynamic random access memory (DRAM), static random access memory (SRAM), flash memory, non-volatile memory, CD-ROMs, CD-Rs, CD+Rs, CD-RWs, CD+RWs, DVD-ROMs, DVD-Rs, DVD+Rs, DVD-RWs, DVD+RWs, DVD-RAMs, BD-ROMs, BD-Rs, BD-R LTHs, BD-REs, blue-ray or optical disk storage, hard disk drive (HDD), solid state drive (SSD), flash memory, card type memory such as multimedia card, secure digital (SD) card, or extreme digital (XD) card, magnetic tapes, floppy disks, magneto-optical data storage devices, optical data storage devices, hard disks, solid-state disks, and any other device that is configured to store the instructions or software and any associated data, data files, and data structures in a non-transitory manner and providing the instructions or software and any associated data, data files, and data structures to a processor or computer so that the processor or computer can execute the instructions. In one example, the instructions or software and any associated data, data files, and data structures are distributed over network-coupled computer systems so that the instructions and software and any associated data, data files, and data structures are stored, accessed, and executed in a distributed fashion by the one or more processors or computers.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. A method of predicting an intention, the method comprising:
   acquiring a gaze sequence of a user;
   acquiring an input image corresponding to the gaze sequence;
   generating a coded image by visually encoding temporal information included in the gaze sequence to the input image; and
   predicting an intention of the user corresponding to the gaze sequence based on the input image and the coded image,
   wherein the generating comprises:
   generating coded partial images by encoding the temporal information to each RGB channel in regions of the input image to which gazes corresponding to the gaze sequence are mapped; and
   generating the coded image by combining the coded partial images.

2. The method of claim 1, wherein the temporal information comprises any one or any combination of a gaze trajectory corresponding to the gaze sequence in the input image, a velocity during eye movements, a duration of each fixation, whether the fixations are repeated on a previous region, a count of the recurrent/repeated fixations, an interval of the recurrent/repeated fixations, and a coverage of the fixations.

3. The method of claim 1, wherein the generating of the coded partial images comprises generating circles corresponding to the temporal information in the regions.

4. The method of claim 3, further comprising increasing an intensity value of a circle among the circles, in response to a gaze of the gazes returning to the circle.

5. The method of claim 3, further comprising setting a radius of a circle among the circles to be smaller than an average radius of the circles, in response to a velocity during eye movements being greater than a threshold.

6. The method of claim 3, further comprising setting a radius of a circle among the circles to be greater than an average radius of the circles, in response to a velocity during eye movements being smaller than a threshold.

7. The method of claim 3, wherein the generating of the circles comprise generating a circle among the circles having a radius greater than an average radius of the circles, in response to a maximum distance or an average distance of the gazes for a timestep being less than a threshold.

8. The method of claim 3, wherein the generating of the circles comprise generating a circle among the circles to have a radius lesser than an average radius of the circles, in response to a maximum distance or an average distance of the gazes for a timestep being greater than a threshold.

9. The method of claim 1, wherein the predicting comprises:
   obtaining feature vectors corresponding to the gaze sequence based on the input image and the coded image; and
   predicting the intention of the user based on the feature vectors.

10. The method of claim 9, wherein the obtaining of the feature vectors comprises:
    extracting first feature vectors from regions of the input image to which gazes corresponding to the gaze sequence are mapped;
    extracting second feature vectors based on the coded image; and
    obtaining feature vectors corresponding to the gaze sequence by concatenating the first feature vectors and the second feature vectors.

11. The method of claim 10, wherein the first feature vectors are extracted based on applying the regions of the input image to a first feature encoder that is trained to extract the first feature vectors from the image sequence, and the second feature vectors are extracted based on applying the coded image a second feature encoder that is trained to extract the second feature vectors from the gaze sequence.

12. The method of claim 1, wherein the input image is acquired based on a first sampling frequency, and
    the gaze sequence is acquired based on a second sampling frequency that is higher than the first sampling frequency.

13. The method of claim 12, wherein the generating comprises:
    accumulating gazes sampled based on the second sampling frequency, based on the first sampling frequency; and
    generating a coded image synchronized to the first sampling frequency, based on a sequence of the accumulated gazes.

14. The method of claim 1, wherein the intention of the user comprises any one or any combination of search, counting, object identification, and freeview.

15. The method of claim 1, further comprising:
    providing information according to the intention based on any one or any combination of the intention, the gaze sequence, and the input image.

16. A non-transitory computer-readable storage medium storing instructions that, when executed by a processor, cause the processor to perform the method of claim 1.

17. An apparatus for predicting an intention, the apparatus comprising:
    one or more processors configured to
    acquire a gaze sequence of a user and an input image corresponding to the gaze sequence,
    generate a coded image by visually encoding temporal information included in the gaze sequence to the input image, and
    predict an intention of the user corresponding to the gaze sequence based on the input image and the coded image,
    wherein, for the generating of the coded image, the one or more processors are further configured to:

generate coded partial images by encoding the temporal information to each RGB channel in regions of the input image to which gazes corresponding to the gaze sequence are mapped; and generate the coded image by combining the coded partial images.

18. The apparatus of claim 17, wherein the temporal information comprises any one or any combination of a gaze trajectory corresponding to the gaze sequence in the input image, a velocity during eye movements, a duration of each fixation, whether the fixations are repeated on a previous region, a count of the recurrent/repeated fixations, an interval of the recurrent/repeated fixations, and a coverage of the fixations.

19. The apparatus of claim 17, wherein the one or more processors are further configured to generate circles corresponding to the temporal information in the regions.

20. The apparatus of claim 17, wherein the one or more processors are further configured to obtain feature vectors corresponding to the gaze sequence based on the input image and the coded image, and to predict the intention of the user based on the feature vectors.

21. The apparatus of claim 20, wherein the one or more processors are further configured to extract first feature vectors from regions of the input image to which gazes corresponding to the gaze sequence are mapped, to extract second feature vectors based on the coded image, and to obtain feature vectors corresponding to the gaze sequence by concatenating the first feature vectors and the second feature vectors.

22. The apparatus of claim 17, wherein the input image is acquired based on a first sampling frequency, and the gaze sequence is acquired based on a second sampling frequency that is higher than the first sampling frequency.

23. The apparatus of claim 17, wherein the one or more processors are further configured to accumulate gazes sampled based on the second sampling frequency, based on the first sampling frequency, and generate a coded image synchronized to the first sampling frequency, based on a sequence of the accumulated gazes.

24. The apparatus of claim 17, wherein the one or more processors are further configured to provide information according to the intention based on any one or any combination of the intention, the gaze sequence, and the input image.

* * * * *